US012106690B2

(12) United States Patent
Lee et al.

(10) Patent No.: US 12,106,690 B2
(45) Date of Patent: Oct. 1, 2024

(54) METHOD OF DETECTING SHORT OF A DISPLAY APPARATUS

(71) Applicant: Samsung Display Co., LTD., Yongin-si (KR)

(72) Inventors: Dongsun Lee, Hwaseong-si (KR); Wonkyu Kwak, Seongnam-si (KR); Dong Eup Lee, Asan-si (KR); Dongsoo Kim, Hwaseong-si (KR); Seungwoo Sung, Cheonan-si (KR); Mincheol Lee, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 133 days.

(21) Appl. No.: 17/974,638

(22) Filed: Oct. 27, 2022

(65) Prior Publication Data

US 2023/0196956 A1 Jun. 22, 2023

(30) Foreign Application Priority Data

Dec. 21, 2021 (KR) ........................ 10-2021-0183616

(51) Int. Cl.
*G09G 3/00* (2006.01)
*G09G 3/3233* (2016.01)

(52) U.S. Cl.
CPC ........... *G09G 3/006* (2013.01); *G09G 3/3233* (2013.01); *G09G 2330/12* (2013.01)

(58) Field of Classification Search
CPC ... G09G 3/006; G09G 3/3233; G09G 2330/12
See application file for complete search history.

(56) References Cited

U.S. PATENT DOCUMENTS

| | | | | |
|---|---|---|---|---|
| 2011/0130981 | A1* | 6/2011 | Chaji | G01R 31/44 702/58 |
| 2012/0286138 | A1* | 11/2012 | Yamazaki | H04N 25/673 250/208.1 |
| 2016/0189644 | A1* | 6/2016 | So | G09G 3/3233 345/103 |

FOREIGN PATENT DOCUMENTS

| | | |
|---|---|---|
| KR | 10-2018-0132200 | 12/2018 |
| KR | 10-2019-0069180 | 6/2019 |
| KR | 10-2021-0038767 | 4/2021 |

* cited by examiner

*Primary Examiner* — Paresh Patel
(74) *Attorney, Agent, or Firm* — KILE PARK REED & HOUTTEMAN PLLC

(57) ABSTRACT

A method includes applying first different voltages to pixels included in a reference pixel column and pixels included in a pad adjacent pixel column electrically connected to a second pad adjacent to a first pad connected to the reference pixel column, and applying second different voltages to the pixels included in the reference pixel column and to pixels included in a line adjacent pixel column electrically connected to a second data line adjacent to a first data line connected to the reference pixel column.

20 Claims, 13 Drawing Sheets

FIG. 15

RC RC

| | PC1 | PC2 | PC3 | PC4 |
|---|---|---|---|---|
| PSD(SS1_ON SS2_OFF) | HV | HV | LV | LV |
| WSD(SS1_OFF SS2_ON) | HV | LV | HV | LV |

TV1:HV TV2:LV

METHOD OF DETECTING SHORT OF A DISPLAY APPARATUS

CROSS-REFERENCE TO RELATED APPLICATION(S)

This application claims priority to and benefits of Korean Patent Application No. 10-2021-0183616 under 35 U.S.C. § 119, filed on Dec. 21, 2021, in the Korean Intellectual Property Office (KIPO), the entire contents of which are herein incorporated by reference.

BACKGROUND

1. Technical Field

Embodiments of the disclosure relate to a method of detecting a short of a display device including detecting a short between adjacent pads and adjacent data lines.

2. Description of the Related Art

Generally, a display device may include a display panel, a driving controller, gate driver, and a data driver. The display panel may include gate lines, data lines, and pixels electrically connected to the gate lines and the data lines. The gate driver may provide gate signals to the gate lines. The data driver may provide data voltages to the data lines. The driving controller may control the gate driver and the data driver.

The data lines may be disposed on the same layer. A short may occur between adjacent data lines disposed on the same layer. Since a desired data voltage cannot be provided to each of the pixels in case that a short occurs, a process of detecting whether the short exists in the data lines before manufacturing the display device may be performed.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments of the disclosure provide a method of detecting a short of a display device including detecting a short between adjacent pads.

Embodiments of the disclosure also provide a method of detecting a short of a display device including detecting a short between adjacent data lines.

According to embodiments of the disclosure, a method of detecting a short of a display device may include applying first different voltages to pixels included in a reference pixel column and pixels included in a pad adjacent pixel column electrically connected to a second pad adjacent to a first pad electrically connected to the reference pixel column, applying second different voltages to the pixels included in the reference pixel column and to pixels included in a line adjacent pixel column electrically connected to a second data line adjacent to a first data line electrically connected to the reference pixel column, detecting whether the short exists between the first pad and the second pad based on luminance of the pixels included in the reference pixel column and luminance of the pixels included in the pad adjacent pixel column, and detecting whether the short exists between the first data line and the second data line based on the luminance of the pixels included in the reference pixel column and luminance of the pixels included in the line adjacent pixel column.

In an embodiment, the applying of the first different voltages to the pixels included in the reference pixel column and the pixels included in the pad adjacent pixel column may include applying a first test voltage to the pixels included in the reference pixel column, and applying a second test voltage different from the first test voltage to the pixels included in the pad adjacent pixel column.

In an embodiment, the applying of the second different voltages to the pixels included in the reference pixel column and the pixels included in the line adjacent pixel column may include applying the second test voltage to the pixels included in the line adjacent pixel column.

In an embodiment, pads electrically connected to a N-th pixel column, where N may be a positive integer, may be adjacent to pads electrically connected to a (N+2)-th pixel column.

In an embodiment, all pads may have a stepwise arrangement of two pixel columns.

In an embodiment, data lines electrically connected to pixels included in a (K−2)-th pixel column, where K may be a multiple of 3, may be electrically connected to a first test line, data lines electrically connected to pixels included in a (K−1)-th pixel column may be electrically connected to a second test line, and data lines electrically connected to pixels included in a K-th pixel column may be electrically connected to a third test line.

In an embodiment, a first switching element may be disposed between the first test line and the data lines electrically connected to the pixels included in the (K−2)-th pixel column, a second switching element may be disposed between the second test line and the data lines electrically connected to the pixels included in the (K−1)-th pixel column, and a third switching element may be disposed between the third test line and the data lines electrically connected to the pixels included in the K-th pixel column.

In an embodiment, the method may further include determining the reference pixel column as the (K−2)-th pixel column in a first short detection period, determining the reference pixel column as the (K−1)-th pixel column in a second short detection period, and determining the reference pixel column as the K-th pixel column in a third short detection period.

In an embodiment, a pixel column may include a red pixel, a blue pixel, and two green pixels.

In an embodiment, the detecting of whether the short exists between the first pad and the second pad may include detecting whether the short exists between the first pad electrically connected to the red pixel and the blue pixel included in the reference pixel column and the second pad electrically connected to the red pixel and the blue pixel included in the pad adjacent pixel column, and detecting whether the short exists between the first pad electrically connected to the green pixel included in the reference pixel column and the second pad electrically connected to the green pixel included in the pad adjacent pixel column.

In an embodiment, the detecting of whether the short exists between the first data line and the second data line may include detecting whether the short exists between the first data line electrically connected to the red pixel and the blue pixel included in the reference pixel column and the second data line electrically connected to the red pixel and the blue pixel included in the line adjacent pixel column, and detecting whether the short exists between the first data line electrically connected to the green pixel included in the reference pixel column and the second data line electrically connected to the green pixel included in the line adjacent pixel column.

According to embodiments of the disclosure, a method of detecting a short of a display device may include applying first different voltages to pixels included in a reference pixel column and pixels included in a pad adjacent pixel column electrically connected to a second pad adjacent to a first pad electrically connected to the reference pixel column in a pad short detection mode, detecting whether the short exists between the first pad and the second pad based on luminance of the pixels included in the reference pixel column and luminance of the pixels included in the pad adjacent pixel column in the pad short detection mode, applying second different voltages to the pixels included in the reference pixel column and to pixels included in a line adjacent pixel column electrically connected to a second data line adjacent to a first data line electrically connected to the reference pixel column in a line short detection mode, and detecting whether the short exists between the first data line and the second data line based on the luminance of the pixels included in the reference pixel column and luminance of the pixels included in the line adjacent pixel column in the line short detection mode.

In an embodiment, pads electrically connected to a N-th pixel column, where N may be a positive integer, may be adjacent to pads electrically connected to a (N+2)-th pixel column.

In an embodiment, data lines electrically connected to pixels included in an odd pixel column may be electrically connected to a first line test line, data lines electrically connected to pixels included in an even pixel column may be electrically connected to a second line test line, data lines electrically connected to pixels included in a (L−3)-th pixel column, where L may be a multiple of 4, and pixels included in a (L−2)-th pixel column may be electrically connected to a first pad test line, and data lines electrically connected to pixels included in a (L−1)-th pixel column and pixels included in a L-th pixel column may be electrically connected to a second pad test line.

In an embodiment, a first test voltage may be applied to the first pad test line, and a second test voltage different from the first test voltage may be applied to the second pad test line in the pad short detection mode.

In an embodiment, a first test voltage may be applied to the first line test line, and a second test voltage different from the first test voltage may be applied to the second line test line in the line short detection mode.

In an embodiment, a first line switching element may be disposed between the first line test line and the data lines electrically connected to the pixels included in the odd pixel column, a second line switching element may be disposed between the second line test line and the data lines electrically connected to the pixels included in the even pixel column, a first pad switching element may be disposed between the first pad test line and the data lines electrically connected to the pixels included in the (L−3)-th pixel column and the (L−2)-th pixel column, and a second pad switching element may be disposed between the second pad test line and the data lines electrically connected to the pixels included in the (L−1)-th pixel column and the L-th pixel column.

In an embodiment, the first line switching element and the second line switching element may be turned on, and the first pad switching element and the second pad switching element may be turned off in the line short detection mode, and the first pad switching element and the second pad switching element may be turned on, and the first line switching element and the second line switching element may be turned off.

In an embodiment, a pixel column may include a red pixel, a blue pixel, and two green pixels.

In an embodiment, the detecting of whether the short exists between the first pad and the second pad may include detecting whether the short exists between the first pad electrically connected to the red pixel and the blue pixel included in the reference pixel column and the second pad electrically connected to the red pixel and the blue pixel included in the pad adjacent pixel column, and detecting whether the short exists between the first pad electrically connected to the green pixel included in the reference pixel column and the second pad electrically connected to the green pixel included in the pad adjacent pixel column. The detecting whether the short exists between the first data line and the second data line may include detecting whether the short exists between the first data line electrically connected to the red pixel and the blue pixel included in the reference pixel column and the second data line electrically connected to the red pixel and the blue pixel included in the line adjacent pixel column, and detecting whether the short exists between the first data line electrically connected to the green pixel included in the reference pixel column and the second data line electrically connected to the green pixel included in the line adjacent pixel column.

Therefore, the method of detecting the short of the display device may detect whether a short exists between adjacent lines and adjacent pads by applying different voltages to pixels included in a reference pixel column and pixels included in a pad adjacent pixel column electrically connected to a second pad adjacent to a first pad electrically connected to the reference pixel column, applying different voltages to the pixels included in the reference pixel column and to pixels included in a line adjacent pixel column electrically connected to a second data line adjacent to a first data line electrically connected to the reference pixel column, detecting whether the short exists between the first pad and the second pad based on luminance of the pixels included in the reference pixel column and luminance of the pixels included in the pad adjacent pixel column, and detecting whether the short exists between the first data line and the second data line based on the luminance of the pixels included in the reference pixel column and luminance of the pixels included in the line adjacent pixel column.

However, the effects of the disclosure are not limited to the above-described effects, and may be variously expanded without departing from the spirit and scope of the disclosure.

BRIEF DESCRIPTION OF THE DRAWINGS

FIG. 15 is a table schematically illustrating an example of detecting whether a short exists according to the method of FIG. 12.

DETAILED DESCRIPTION OF THE EMBODIMENTS

Figure 1:
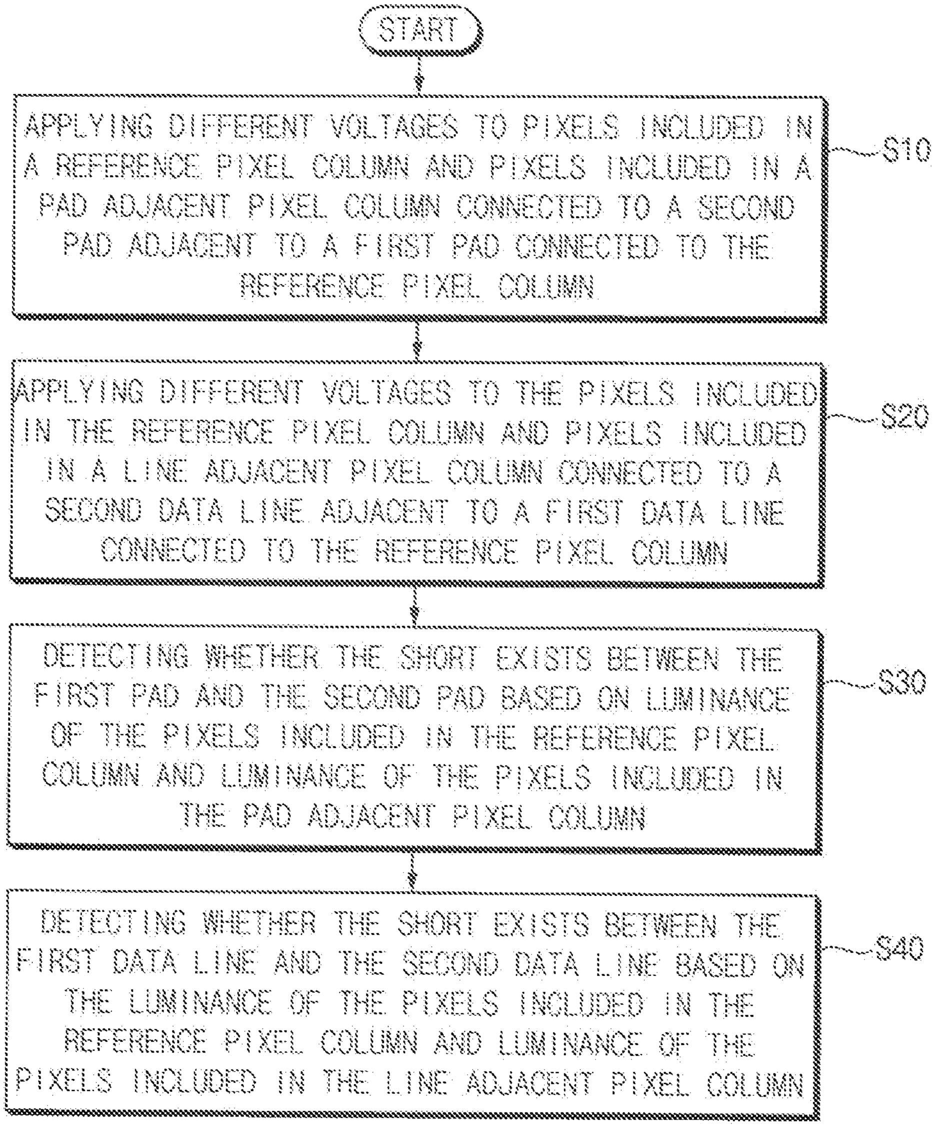
FIGS. 1 to 3 are flowcharts schematically illustrating a method of detecting a short of a display device according to embodiments of the disclosure.

Hereinafter, the disclosure will be explained in detail with reference to the accompanying drawings. In the drawings, sizes, thicknesses, ratios, and dimensions of the elements may be exaggerated for ease of description and for clarity. Like numbers refer to like elements throughout.

As used herein, the singular forms, "a," "an," and "the" are intended to include the plural forms as well, unless the context clearly indicates otherwise.

It will be understood that the terms "connected to" or "coupled to" may include a physical or electrical connection or coupling.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

It will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween.

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
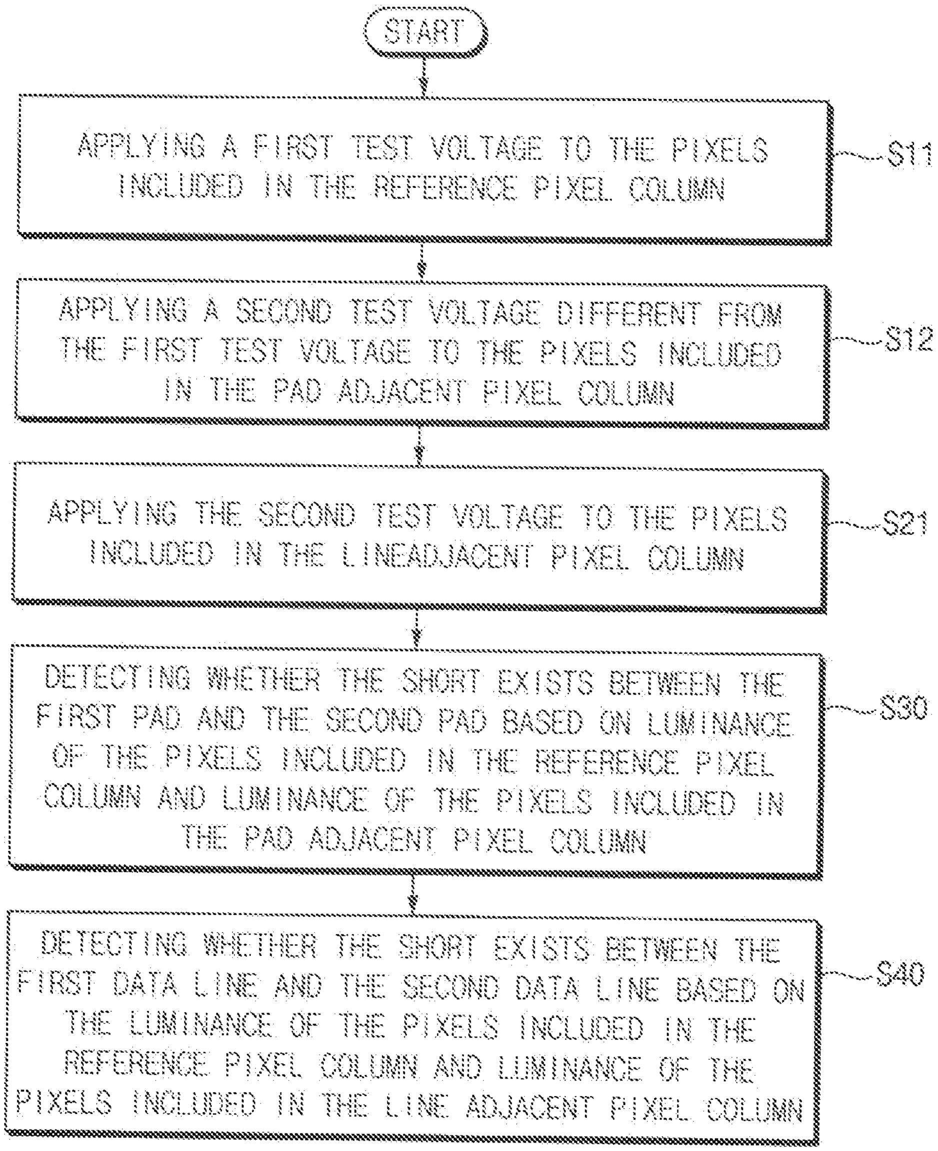
Figure 3:
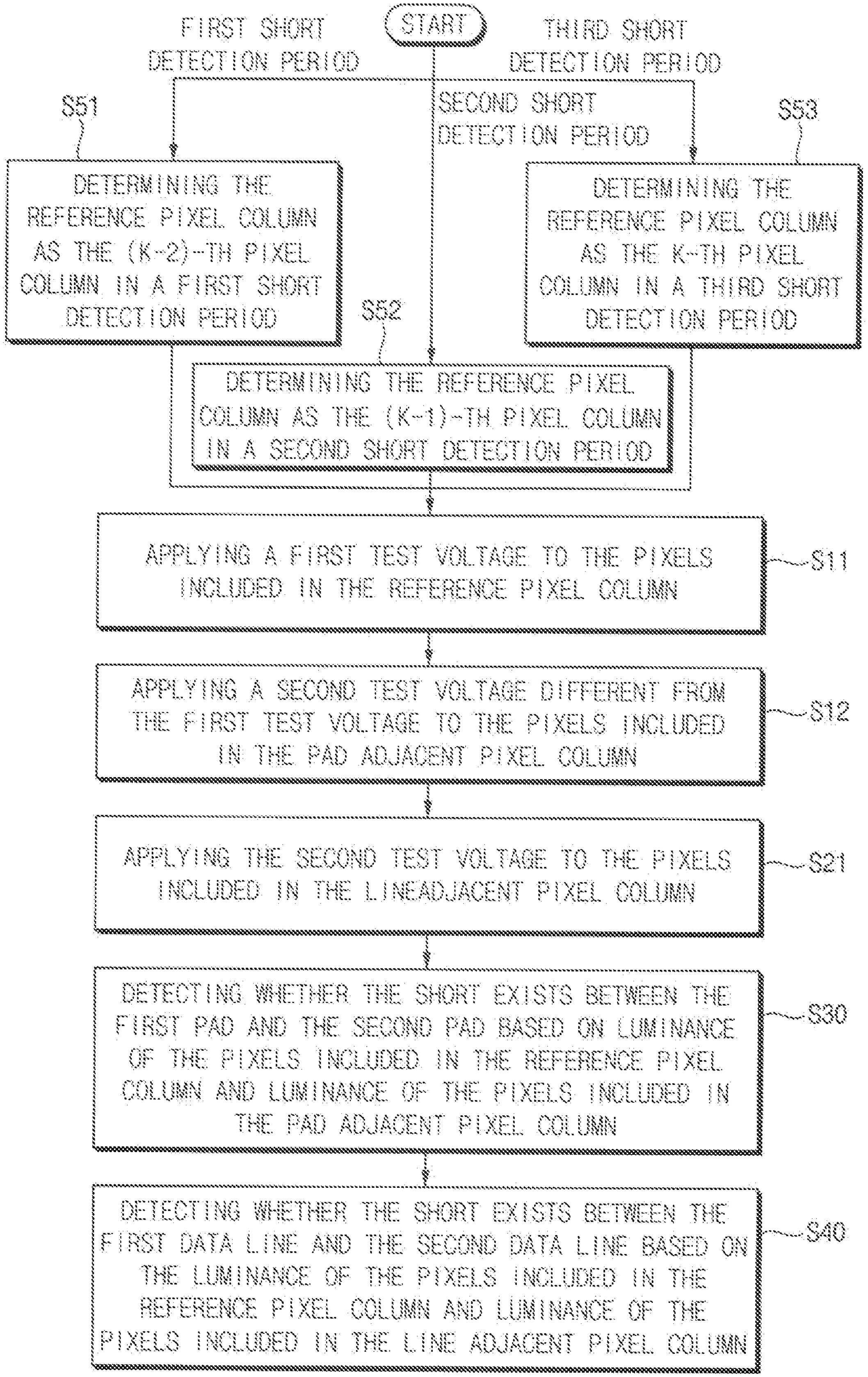
Figure 4:
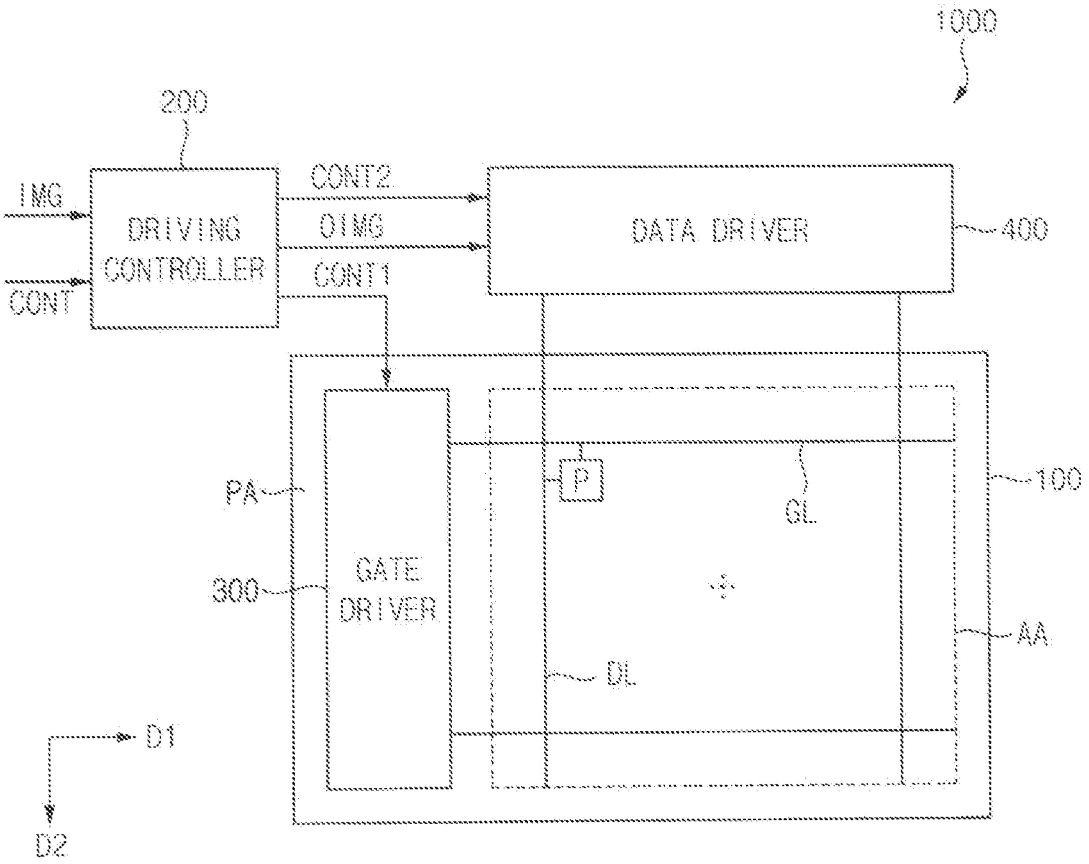
FIG. 4 is a diagram schematically illustrating an example of a display device in which the method of FIG. 1 may be performed.
Figure 5:
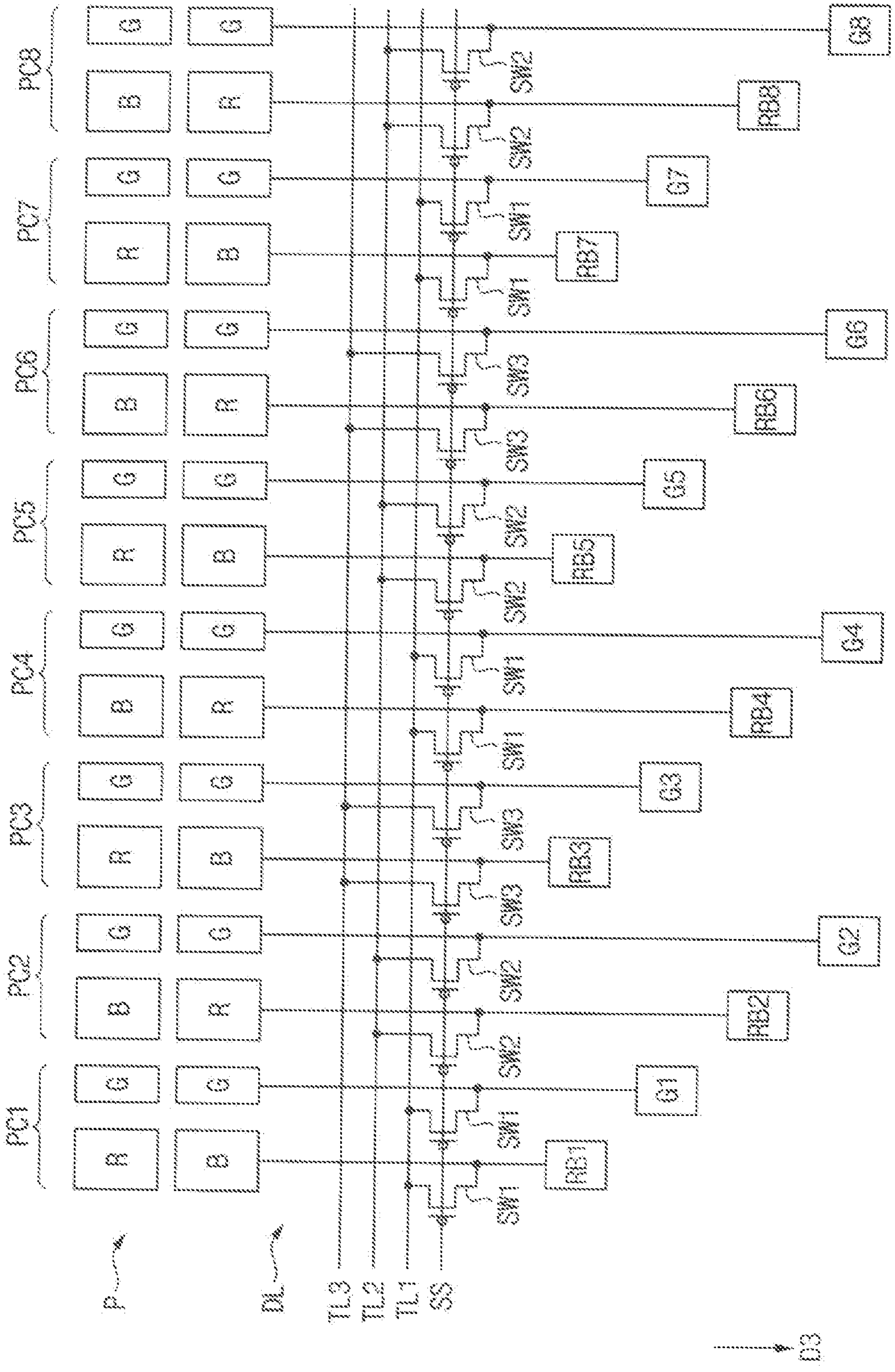
FIG. 5 is a diagram schematically illustrating an example of pixels, data lines, and pads of the display device of FIG. 4.
Figure 6:
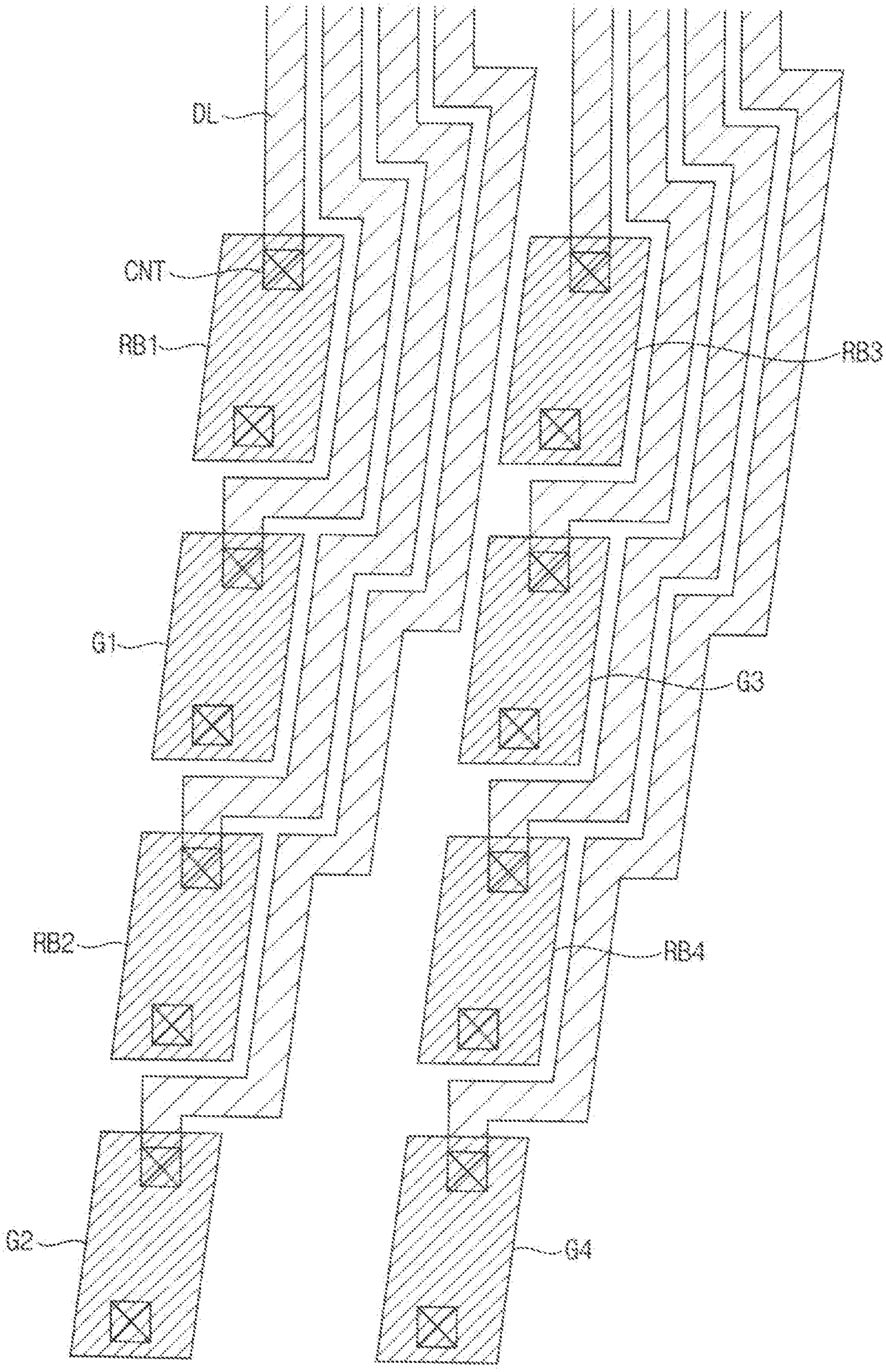
FIG. 6 is a layout view schematically showing an arrangement of multiple pads of FIG. 5.
Figure 7:
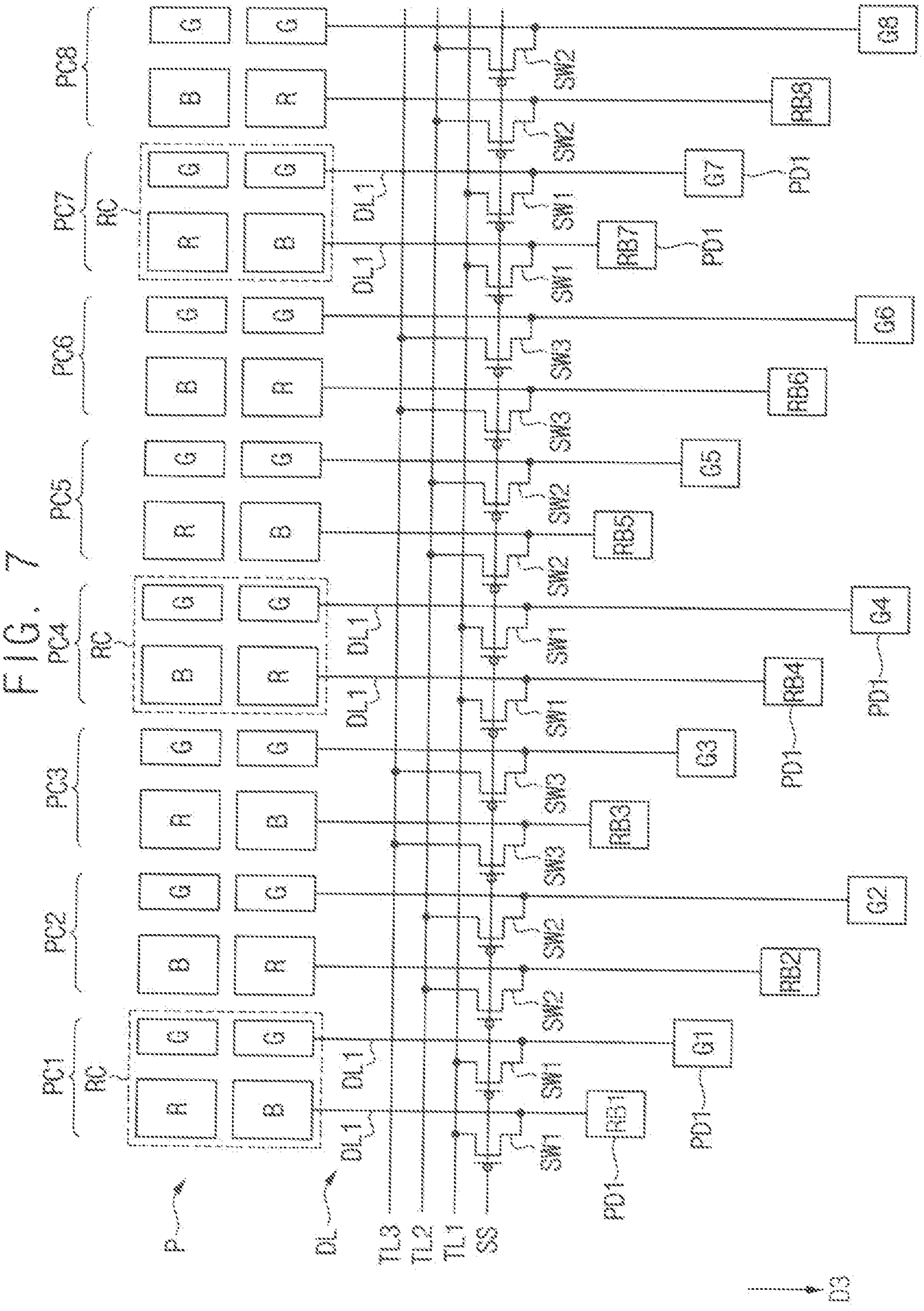
FIG. 7 is a diagram schematically illustrating an example of pixels, data lines, and pads of the display device of FIG. 4 in a first short detection period.
Figure 8:
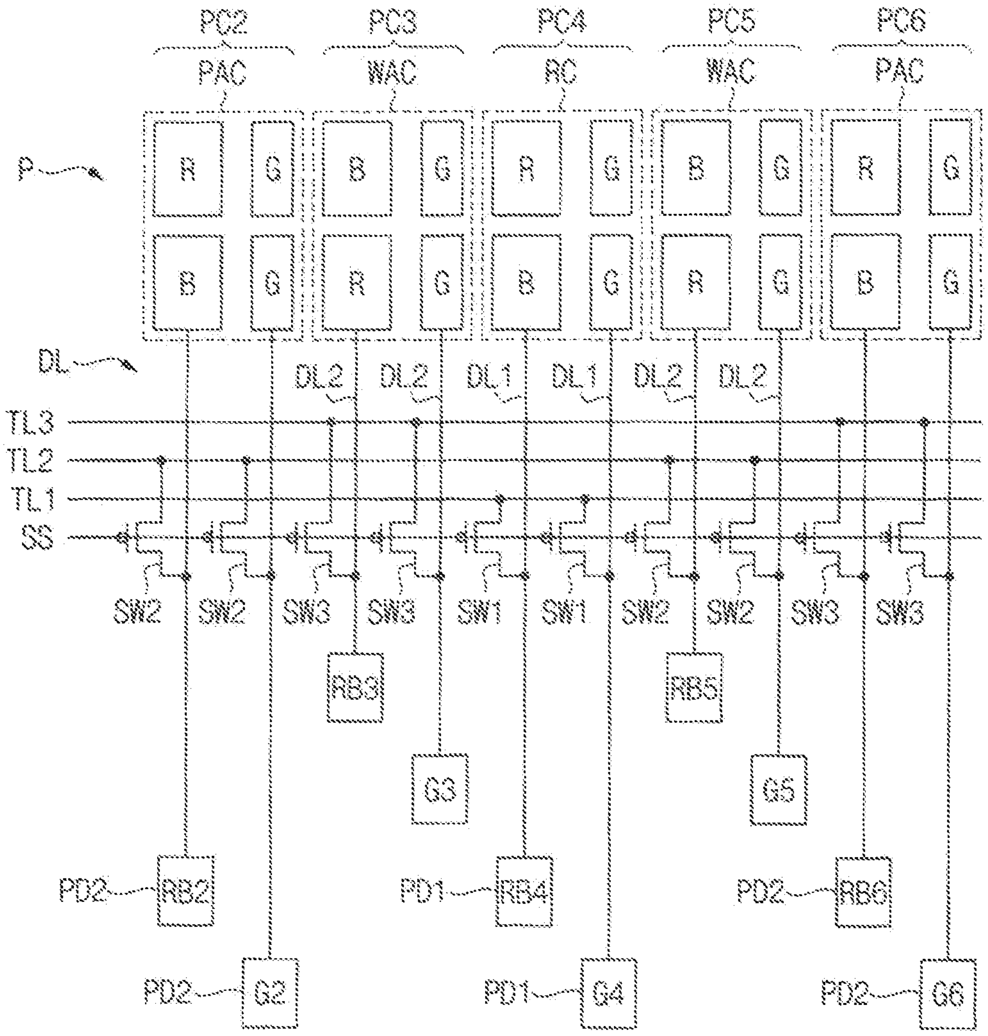
FIG. 8 is a diagram schematically illustrating FIG. 7 based on a fourth pixel column.
Figure 9:
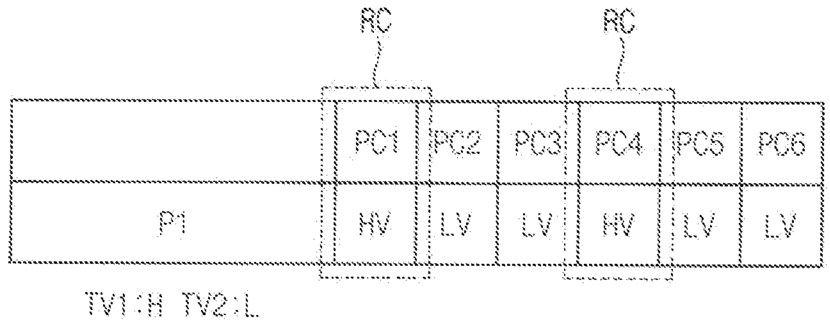
FIG. 9 is a table schematically illustrating an example of detecting whether a short exists in a first short detection period according to the method of FIG. 1.
Figure 10:
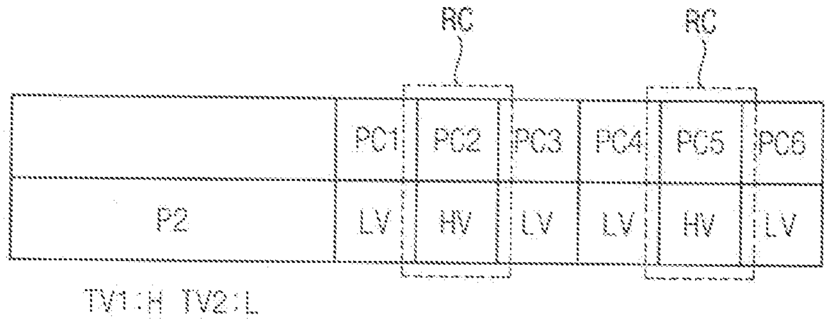
FIG. 10 is a table schematically illustrating an example of detecting whether a short exists in a second short detection period according to the method of FIG. 1.
Figure 11:
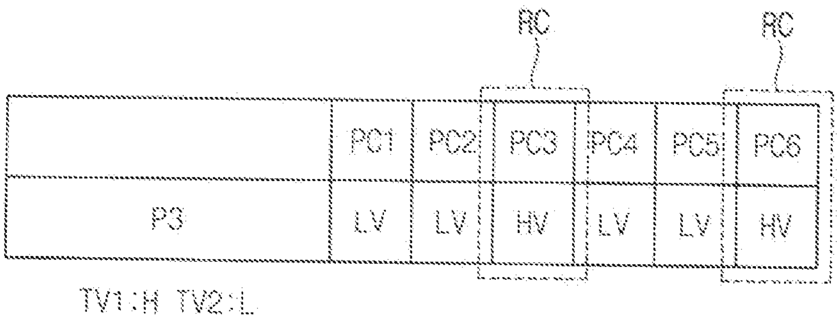
FIG. 11 is a table schematically illustrating an example of detecting whether a short exists in a third short detection period according to the method of FIG. 1.

FIGS. 1 to 3 are flowcharts schematically illustrating a method of detecting a short of a display device according to embodiments of the disclosure. FIG. 4 is a diagram schematically illustrating an example of a display device 1000 in which the method of FIG. 1 may be performed. FIG. 5 is a diagram schematically illustrating an example of pixels P, data lines DL, and pads (RB1, G1, RB2, G2, . . . ) of the display device of FIG. 4. FIG. 6 is a layout view schematically showing an arrangement of multiple pads (RB1, G1, RB2, G2, . . . ) of FIG. 5. FIG. 7 is a diagram schematically illustrating an example of the pixels P, data lines DL, and the pads (RB1, G1, RB2, G2, . . . ) of the display device 1000 of FIG. 4 in a first short detection period P1. FIG. 8 is a diagram schematically illustrating FIG. 7 based on a fourth pixel column PC4. FIG. 9 is a table schematically illustrating an example of detecting whether a short exists in the first short detection period P1 according to the method of FIG. 1. FIG. 10 is a table schematically illustrating an example of detecting whether a short exists in a second short detection period P2 according to the method of FIG. 1. FIG. 11 is a table schematically illustrating an example of detecting whether a short exists in a third short detection period P3 according to the method of FIG. 1.

Referring to FIGS. 1 to 11, the method of FIG. 1 may apply different voltages to pixels included in a reference pixel column RC and pixels included in a pad adjacent pixel column PAC connected to a second pad PD2 adjacent to a first pad PD1 connected to the reference pixel column RC (S10), apply different voltages to the pixels included in the reference pixel column RC and pixels included in a line adjacent pixel column WAC connected to a second data line DL2 adjacent to a first data line DL1 connected to the reference pixel column RC (S20), detect whether the short exists between the first pad PD1 and the second pad PD2 based on luminance of the pixels included in the reference pixel column RC and luminance of the pixels included in the pad adjacent pixel column PAC (S30), and detect whether the short exists between the first data line DL1 and the second data line DL2 based on the luminance of the pixels included in the reference pixel column RC and luminance of the pixels included in the line adjacent pixel column WAC (S40). A detailed description will be given later with reference to FIGS. 4 to 11.

Referring to FIG. 4, the display device 1000 may include a display panel 100, a driving controller 200, a gate driver 300, and a data driver 400. In an embodiment, the driving controller 200 and the data driver 400 may be integrated into a chip.

The display panel 100 may include a display region AA on which an image may be displayed and a peripheral region PA adjacent to the display region AA. In an embodiment, the gate driver 300 may be mounted on the peripheral region PA of the display panel 100.

The display panel 100 may include gate lines GL, data lines DL, and pixels P electrically connected to the data lines DL and the gate lines GL. The gate lines GL may extend in a first direction D1 and the data lines DL may extend in a second direction D2 crossing (intersecting) the first direction D1.

The driving controller 200 may receive input image data IMG and an input control signal CONT from a host processor (e.g., a graphic processing unit; GPU). For example, the input image data IMG may include red image data, green image data and blue image data. In an embodiment, the input image data IMG may further include white image data. As another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, and output image data OIMG based on the input image data IMG and the input control signal CONT.

The driving controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The driving controller 200 may receive the input image data IMG and the input control signal CONT, and generate the output image data OIMG. The driving controller 200 may output the output image data OIMG to the data driver 400.

The gate driver 300 may generate gate signals for driving the gate lines GL in response to the first control signal CONT1 input from the driving controller 200. The gate driver 300 may output the gate signals to the gate lines GL. For example, the gate driver 300 may sequentially output the gate signals to the gate lines GL.

The data driver 400 may receive the second control signal CONT2 and the output image data OIMG from the driving controller 200. The data driver 400 may convert the output image data OIMG into data voltages having an analog type. The data driver 400 may output the data voltage to the data lines DL.

Referring to FIGS. 4 to 6, in an embodiment, a pixel P may include a red pixel R, a blue pixel B, and a green pixel G. In an embodiment, a pixel column (PC1, PC2, . . . ) may include a red pixel R, a blue pixel B, and two green pixels G. In an embodiment, in a pixel column (PC1, PC2, . . . ), the same data line DL may be connected to the red pixel R and the blue pixel B, and the data line DL connected to the green pixel G may be different from the data line DL connected to the red pixel R and the blue pixel B.

In an embodiment, the data lines DL connected to pixels included in a (K−2)-th pixel column (PC1, PC4, . . . ), where K may be a multiple of 3, may be connected to a first test line TL1, the data lines DL connected to pixels included in a (K−1)-th pixel column (PC2, PC5, . . . ) may be connected to a second test line TL2, and the data lines DL connected to pixels included in a K-th pixel column (PC3, PC6, . . . ) may be connected to a third test line TL3. In an embodiment, a first switching element SW1 may be disposed between the first test line TL1 and the data lines DL connected to the pixels included in the (K−2)-th pixel column (PC1, PC4, . . . ), a second switching element SW2 may be disposed between the second test line TL2 and the data lines DL connected to the pixels included in the (K−1)-th pixel column (PC2, PC5, . . . ), and a third switching element SW3 may be disposed between the third test line TL3 and the data lines DL connected to the pixels included in the K-th pixel column (PC3, PC6, . . . ). For example, the first switching element SW1, the second switching element SW2, and the third switching element SW3 may be PMOS transistors. For example, the first switching element SW1, the second switching element SW2, and the third switching element SW3 may be transistors that may be turned on or off in response to a switching signal SS. While a short detection may be performed, the first switching element SW1, the second switching element SW2, and the third switching element SW3 may be turned on. While the display device 1000 may be driven, the first switching element SW1, the second switching element SW2, and the third switching element SW3 may be turned off.

The data lines DL may include pads (RB1, G1, RB2, G2, . . . ) at an end. The pads (RB1, G1, RB2, G2, . . . ) may be connected to the pixels P through the data line DL. For example, the pads (RB1, G1, RB2, G2, . . . ) may be connected to an IC chip including the data driver 400. For example, the pads (RB1, G1, RB2, G2, . . . ) may connect the IC chip including the data driver 400 and the data line DL. The pads (RB1, G1, RB2, G2, . . . ) may not be connected to anything except the data line DL while the short detection may be performed. All pads (RB1, G1, RB2, G2, . . . ) may have a stepwise arrangement by two pixel columns (PC1, PC2, . . . ). For example, as shown in FIG. 5, the pads RB2 and G2 connected to the second pixel column PC2 may be disposed at a position moved in the third direction D3 rather than the pads RB1 and G1 connected to the first pixel column PC1. For example, the pads RB3 and G3 connected to the third pixel column PC3 may not be disposed at a position moved in the third direction D3 rather than the pads RB1 and G1 connected to the first pixel column PC1. The third direction D3 may be independent of a layer, and all the pads (RB1, G1, RB2, G2, . . . ) may be disposed on the same layer. However, the third direction D3 is only an example and embodiments are not limited thereto. For example, as shown in FIG. 6, the pads RB1 and G1 connected to the first pixel column PC1 and the pads RB3 and G3 connected to the third pixel column PC3 may be adjacent to each other. The pads RB1, G1, RB2, and G2 connected to the first pixel column PC1 and the second pixel column PC2 may be arranged in a stepwise manner. Also, the pads (RB1, G1, RB2, G2, . . . ) may be connected to the data lines DL through a contact CNT. Accordingly, the pads (RB1, G1, RB2, G2, . . . ) connected a N-th pixel column, where N may be a positive integer, may be adjacent to the pads connected to the (N+2)-th pixel column (RB1, G1, RB2, G2, . . . ). For example, the pads RB1 and G1 connected to the first pixel column PC1 may be adjacent to the pads RB3 and G3 connected to the third pixel column PC3. For example, the pads RB2 and G2 connected to the second pixel column PC2 may be adjacent to the pads RB4 and G4 connected to the fourth pixel column PC4. FIGS. 5, 7, and 8 illustrate that the distance between the pads connected to the N-th pixel column and the pads connected to the (N+2)-th pixel column (e.g., the distance between RB1 and RB3) may be large for convenience. But, as shown in FIG. 6, the distance between the pads connected to the N-th pixel column and the pads connected to the (N+2)-th pixel column may be narrow enough to cause the short.

FIGS. 1 to 3, and 6 to 11, specifically, the method of FIG. 1 may apply different voltages to pixels included in a reference pixel column RC and pixels included in a pad adjacent pixel column PAC connected to a second pad PD2 adjacent to a first pad PD1 connected to the reference pixel column RC (S10). In an embodiment, the method of FIG. 1 may apply a first test voltage TV1 to the pixels included in the reference pixel column RC (S11), and apply a second test voltage TV2 different from the first test voltage TV1 to the pixels included in the pad adjacent pixel column PAC (S12). In an embodiment, the method of FIG. 1 may determine the reference pixel column RC as the (K−2)-th pixel column (PC1, PC4, . . . ) in the first short detection period P1 (S51), determine the reference pixel column RC as the (K−1)-th pixel column (PC2, PC5, . . . ) in the second short detection period P2 (S52), and determine the reference pixel column RC as the K-th pixel column (PC3, PC6, . . . ) in the third short detection period P3 (S53).

For example, in case that the (K−2)-th pixel column (PC1, PC4, . . . ) may be determined as the reference pixel column RC (i.e., the first short detection period P1), the first test voltage TV1 may be applied to the first test line TL1, and the second test voltage TV2 may be applied to the second test line TL2 and the third test line TL3. For example, the pixels included in the (K−2)-th pixel column (PC1, PC4, . . . ) may receive the first test voltage TV1, and the remaining pixel columns (i.e., the (K−1)-th pixel column and the K-th pixel column) may receive the second test voltage TV2. Accordingly, the first test voltage TV1 may be applied to the pixels included in the reference pixel column RC (i.e., the (K−2)-th pixel column in this example), and the second test voltage TV2 may be applied to the pixels included in the pad adjacent pixel column PAC (e.g., a second pixel column PC2 and a sixth pixel column PC6 based on a fourth pixel column PC4 among the reference pixel column RC) connected to the second pad PD2 (e.g., RB2, G2, RB6, and G6 based on the fourth pixel column PC4 among the reference pixel column RC) adjacent to the first pad PD1 (i.e., RB1, G1, RB4, and G4, . . . in this example) connected to the reference pixel column RC (i.e., the (K−2)-th pixel column in this example). The second pad PD2 and the pad adjacent pixel column PAC may vary according to the reference pixel column RC as a reference. A detailed description thereof will be given later. However, since the second test voltage TV2 may be applied to pixels included in all pixel columns other than the reference pixel column RC, the second test voltage TV2 may be applied to the pixels included in the pad adjacent pixel column PAC regardless of which reference pixel column RC may be used as a reference. This may also be the case in the second short detection period P2 and the third short detection period P3.

For example, as shown in FIG. 8, when looking at the fourth pixel column PC4 as a reference, the first pads PD1 connected to the fourth pixel column PC4 may be RB4 and G4. The pads adjacent to pads RB4 and G4 connected to the fourth pixel column PC4 may be the pads RB2 and G2 connected to the second pixel column PC2 and the pads RB6 and G6 connected to the sixth pixel column PC6. Accordingly, when looking at the fourth pixel column PC4 as a reference, the pad adjacent pixel column PAC may be the second pixel column PC2 and the sixth pixel column PC6. Also, when looking at the first pixel column PC1 as a reference, the pad adjacent pixel column PAC may be the third pixel column PC3. However, since the second test voltage TV2 may be applied to the pixels included in the second pixel column PC2, the third pixel column PC3, and the sixth pixel column PC6, the second test voltage TV2 may be applied to the pixels included in the pad adjacent pixel column PAC regardless of which pixel column among the first pixel column PC1 and the fourth pixel column PC4 may be referenced.

Specifically, the method of FIG. 1 may detect whether the short exists between the first pad PD1 and the second pad PD2 based on luminance of the pixels included in the reference pixel column RC and luminance of the pixels included in the pad adjacent pixel column PAC (S30). For example, the detecting whether the short exists between the first pad PD1 and the second pad PD1 may include detecting whether the short exists between the first pad PD1 (e.g., RB1, RB4, . . . in the first short detection period P1) connected to the red pixel R and the blue pixel B included in the reference pixel column RC and the second pad PD2 (e.g., RB2 and RB6 based on the fourth pixel column PC4 among the reference pixel column RC in the first short detection period P1) connected to the red pixel R and the blue pixel B included in the pad adjacent pixel column PAC (e.g., the second pixel column PC2 and the sixth pixel column PC6 based on the fourth pixel column PC4 among the reference pixel column RC) and detecting whether the short exists between the first pad PD1 (e.g., G1, G4, . . . in the first short detection period P1) connected to the green pixel G included in the reference pixel column RC and the second pad PD2 (e.g., the fourth pixel column PC4 among the reference pixel column RC in the first short detection period P1) connected to the green pixel G included in the pad adjacent pixel column PAC (e.g., the second pixel column PC2 and the sixth pixel column PC6 among the reference pixel column in the first detection period P1).

For example, the first test voltage TV1 may be a high voltage HV (e.g., a voltage for the pixel P to display low luminance), and the second test voltage TV2 may be a low voltage LV (e.g., a voltage for the pixel P to display high luminance). In the first short detection period P1, the high voltage HV may be applied to the pixels included in the (K−2)-th pixel column (PC1, PC4, . . . ), and the low voltage LV may be applied to the pixels included in the (K−1)-th pixel column (PC2, PC5, . . . ) and the K-th pixel columns (PC3, PC6, . . . ). Taking the first pixel column PC1 and the third pixel column PC3 as an example, the high voltage HV may be applied to the pixels included in the first pixel column PC1, and the low voltage LV may be applied to pixels included in the third pixel column PC3 in the first short detection period P1. In case that the short does not exist between the pads RB1 and G1 connected to the first pixel column PC1 and the pads RB3 and G3 connected to the third pixel column PC3, the pixels included in the first pixel column PC1 may display low luminance, and the pixels included in the third pixel column PC3 may display high luminance. In case that the short exists between the pads RB1 and G1 connected to the first pixel column PC1 and the pads RB3 and G3 connected to the third pixel column PC3, the pixels included in the first pixel column PC1 and the third pixel column PC3 may display middle luminance due to a connection between the pads RB1 and G1 connected to the first pixel column PC1 and the pads RB3 and G3 connected to the third pixel column PC3. Accordingly, in the first short detection period P1, the method of FIG. 1 may detect whether the short exists in the pads (RB1, G1, RB4, G4, . . . ) connected to the (K−2)-th pixel column (PC1, PC4, . . . ) by detecting the pixels displaying the middle luminance in the first short detection period P1.

In the second short detection period P2, the high voltage HV may be applied to the pixels included in the (K−1)-th pixel column (PC2, PC5, . . . ), and the low voltage LV may be applied to the pixels included in the (K−2)-th pixel column (PC1, PC4, . . . ) and the K-th pixel columns (PC3, PC6, . . . ). Taking the second pixel column PC2 and the fourth pixel column PC4 as an example, the high voltage HV may be applied to the pixels included in the second pixel column PC2, and the low voltage LV may be applied to pixels included in the fourth pixel column PC4 in the second short detection period P2. In case that the short does not exist between the pads RB2 and G2 connected to the second pixel column PC2 and the pads RB4 and G4 connected to the fourth pixel column PC4, the pixels included in the second pixel column PC2 may display low luminance, and the pixels included in the fourth pixel column PC4 may display high luminance. In case that the short exists between the pads RB2 and G2 connected to the second pixel column PC2 and the pads RB4 and G4 connected to the fourth pixel column PC4, the pixels included in the second pixel column PC2 and the pixels included in the fourth pixel column PC4 may display middle luminance due to a connection between the pads RB2 and G2 connected to the second pixel column PC2 and the pads RB4 and G4 connected to the fourth pixel column PC4. Accordingly, in the second short detection period P2, the method of FIG. 1 may detect whether the short exists in the pads (RB2, G2, RB5, G5, . . . ) connected to the (K−1)-th pixel column (PC2, PC5, . . . ) by detecting the pixels displaying the middle luminance. In the second short detection period P2.

In the third short detection period P3, the high voltage HV may be applied to the pixels included in the K-th pixel column (PC3, PC6, . . . ), and the low voltage LV may be applied to the pixels included in the (K−1)-th pixel column (PC2, PC5, . . . ) and the (K−2)-th pixel columns (PC1, PC4, . . . ). Taking the third pixel column PC3 and the fifth pixel column PC5 as an example, the high voltage HV may be applied to the pixels included in the third pixel column PC3, and the low voltage LV may be applied to pixels included in the fifth pixel column PC5 in the third short detection period P3. In case that the short does not exist between the pads RB3 and G3 connected to the third pixel column PC3 and the pads RB5 and G5 connected to the fifth pixel column PC5, the pixels included in the third pixel column PC3 may display low luminance, and the pixels included in the fifth pixel column PC5 may display high luminance. In case that the short exists between the pads RB3 and G3 connected to the third pixel column PC3 and the pads RB5 and G5 connected to the fifth pixel column PC5, the pixels included in the third pixel column PC3 and the pixels included in the fifth pixel column PC5 may display middle luminance due to a connection between the pads RB3 and G3 connected to the third pixel column PC3 and the pads RB5 and G5 connected to the fifth pixel column PC5. Accordingly, in the third short detection period P3, the method of FIG. 1 may detect whether the short exists in the pads (RB3, G3, RB6, G6, . . . ) connected to the K-th pixel column (PC3, PC6, . . . ) by detecting the pixels displaying the middle luminance. In the third short detection period P3.

Specifically, the method of FIG. 1 may apply different voltages to the pixels included in the reference pixel column RC and pixels included in a line adjacent pixel column WAC connected to the second data line DL2 adjacent to a first data line DL1 connected to the reference pixel column RC (S20). In an embodiment, the method of FIG. 1 may apply the first test voltage TV1 to the pixels included in the reference pixel column RC (S11), and apply the second test voltage TV2 different from the first test voltage TV1 to the pixels included in the line adjacent pixel column WAC (S21). In an embodiment, the method of FIG. 1 may determine the reference pixel column RC as the (K−2)-th pixel column (PC1, PC4, . . . ) in the first short detection period P1 (S51), determine the reference pixel column RC as the (K−1)-th pixel column (PC2, PC5, . . . ) in the second short detection period P2 (S52), and determine the reference pixel column RC as the K-th pixel column (PC3, PC6, . . . ) in the third short detection period P3 (S53). The data line DL connected to the red pixel R and the blue pixel B and the data line DL connected to the green pixel G may not be disposed on the same layer. FIGS. 5, 7, and 8 illustrates that the distance between the data line DL connected to the red pixel R and the blue pixels B and the data line DL connected to the green pixel G as being adjacent to each other for convenience, but the data line DL connected to the red pixel R and the blue pixel B may be disposed on a different layer from the data line DL connected to the green pixel G. Accordingly, the short may not exist between the data line DL connected to the red pixel R and the blue pixel B and the data line DL connected to the green pixel G.

For example, in case that the (K−2)-th pixel column (PC1, PC4, . . . ) may be determined as the reference pixel column RC (i.e., the first short detection period P1), the first test voltage TV1 may be applied to the first test line TL1, and the second test voltage TV2 may be applied to the second test line TL2 and the third test line TL3. For example, the pixels included in the (K−2)-th pixel column (PC1, PC4, . . . ) may receive the first test voltage TV1, and the remaining pixel columns (i.e., the (K−1)-th pixel column and the K-th pixel column) may receive the second test voltage TV2. Accordingly, the first test voltage TV1 may be applied to the pixels included in the reference pixel column RC (i.e., the (K−2)-th pixel column in this example) through the first data line DL1 connected to the reference pixel column RC (i.e., the (K−2)-th pixel column in this example), and the second test voltage TV2 may be applied to the pixels included in the line adjacent pixel column WAC (e.g., the third pixel column PC3 and a fifth pixel column PC5 based on the fourth pixel column PC4 among the reference pixel column RC) connected to the second data line DL2 (e.g., data lines DL connected to the third pixel column PC3 and the fifth pixel column PC5 based on the fourth pixel column PC4 among the reference pixel column RC) adjacent to the first data line DL1. The second data line DL2 and the line adjacent pixel column WAC may vary according to the reference pixel column RC as a reference. A detailed description thereof will be given later. However, since the second test voltage TV2 may be applied to pixels included in all pixel columns other than the reference pixel column RC, the second test voltage TV2 may be applied to the pixels included in the line adjacent pixel column WAC regardless of which reference pixel column RC may be used as a reference. This may also be the case in the second short detection period P2 and the third short detection period P3.

For example, as shown in FIG. 8, when looking at the fourth pixel column PC4 as a reference, the data lines DL adjacent to the data line DL connected to the fourth pixel column PC4 may be the data lines DL connected to the third pixel column PC3 and the fifth pixel column PC5. Accordingly, when looking at the fourth pixel column PC4 as a reference, the line adjacent pixel column WAC may be the third pixel column PC3 and the fifth pixel column PC5. Also, when looking at the first pixel column PC1 as a reference, the line adjacent pixel column WAC may be the second pixel column PC2. However, since the second test voltage TV2 may be applied to the pixels included in the second pixel column PC2, the third pixel column PC3, and the fifth pixel column PC5, the second test voltage TV2 may be applied to the pixels included in the line adjacent pixel column WAC regardless of which pixel column among the first pixel column PC1 and the fourth pixel column PC4 may be referenced.

Specifically, the method of FIG. 1 may detect whether the short exists between the first data line DL1 and the second data line DL2 based on the luminance of the pixels included in the reference pixel column RC and luminance of the pixels included in the line adjacent pixel column WAC (S40). For example, the detecting whether the short exists between the first data line DL1 and the second pad PD1 may include detecting whether the short exists between the first data line DL1 connected to the red pixel R and the blue pixel B included in the reference pixel column RC and the second data line DL2 connected to the red pixel R and the blue pixel B included in the line adjacent pixel column WAC and detecting whether the short exists between the first data line DL1 connected to the green pixel G included in the reference pixel column RC and the second data line DL2 connected to the green pixel G included in the line adjacent pixel column WAC.

For example, the first test voltage TV1 may be the high voltage HV (e.g., a voltage for the pixel P to display low luminance), and the second test voltage TV2 may be the low voltage LV (e.g., a voltage for the pixel P to display high luminance). In the first short detection period P1, the high voltage HV may be applied to the pixels included in the (K−2)-th pixel column (PC1, PC4, . . . ), and the low voltage LV may be applied to the pixels included in the (K−1)-th pixel column (PC2, PC5, . . . ) and the K-th pixel columns (PC3, PC6, . . . ). Taking the first pixel column PC1 and the second pixel column PC2 as an example, the high voltage HV may be applied to the pixels included in the first pixel column PC1, and the low voltage LV may be applied to pixels included in the second pixel column PC2 in the first short detection period P1. In case that the short does not exists between the data line connected to the first pixel column PC1 and the data line DL connected to the second pixel column PC2, the pixels included in the first pixel column PC1 may display low luminance, and the pixels included in the second pixel column PC2 may display high luminance. In case that the short exists between the data line connected to the first pixel column PC1 and the data line DL connected to the second pixel column PC2, the pixels included in the first pixel column PC1 and the pixels included in the second pixel column PC2 may display middle luminance due to a connection between the data line DL connected to the first pixel column PC1 and the data line connected to the second pixel column PC2. Accordingly, in the first short detection period P1, the method of FIG. 1 may detect whether the short exists in the data lines DL connected to the (K−2)-th pixel column (PC1, PC4, . . . ) by detecting the pixels displaying the middle luminance in the first short detection period P1.

In the second short detection period P2, the high voltage HV may be applied to the pixels included in the (K−1)-th pixel column (PC2, PC5, . . . ), and the low voltage LV may be applied to the pixels included in the (K−2)-th pixel column (PC1, PC4, . . . ) and the K-th pixel columns (PC3, PC6, . . . ). Taking the second pixel column PC2 and the third pixel column PC3 as an example, the high voltage HV may be applied to the pixels included in the second pixel column PC2, and the low voltage LV may be applied to pixels included in the third pixel column PC3 in the second short detection period P2. In case that the short does not exists between the data line connected to the second pixel column PC2 and the data line DL connected to the third pixel column PC3, the pixels included in the second pixel column PC2 may display low luminance, and the pixels included in the third pixel column PC3 may display high luminance. In case that the short exists between the data line connected to the second pixel column PC2 and the data line DL connected to the third pixel column PC3, the pixels included in the second pixel column PC2 and the pixels included in the third pixel column PC3 may display middle luminance due to a connection between the data line DL connected to the second pixel column PC2 and the data line connected to the third pixel column PC3. Accordingly, in the second short detection period P2, the method of FIG. 1 may detect whether the short exists in the data lines DL connected to the (K−1)-th pixel column (PC2, PC5, . . . ) by detecting the pixels displaying the middle luminance in the second short detection period P2.

In the third short detection period P3, the high voltage HV may be applied to the pixels included in the K-th pixel column (PC3, PC6, . . . ), and the low voltage LV may be applied to the pixels included in the (K−1)-th pixel column (PC2, PC5, . . . ) and the (K−2)-th pixel columns (PC1, PC4, . . . ). Taking the third pixel column PC3 and the fourth pixel column PC4 as an example, the high voltage HV may be applied to the pixels included in the third pixel column PC3, and the low voltage LV may be applied to pixels included in the fourth pixel column PC4 in the third short detection period P3. In case that the short does not exists between the data line connected to the third pixel column PC3 and the data line DL connected to the fourth pixel column PC4, the pixels included in the third pixel column PC3 may display low luminance, and the pixels included in the fourth pixel column PC4 may display high luminance. In case that the short exists between the data line connected to the third pixel column PC3 and the data line DL connected to the fourth pixel column PC4, the pixels included in the third pixel column PC3 and the pixels included in the fourth pixel column PC4 may display middle luminance due to a connection between the data line DL connected to the third pixel column PC3 and the data line connected to the fourth pixel column PC4. Accordingly, in the third short detection period P3, the method of FIG. 1 may detect whether the short exists in the data lines DL connected to the K-th pixel column (PC3, PC6, . . . ) by detecting the pixels displaying the middle luminance in the third short detection period P3.

Figure 12:
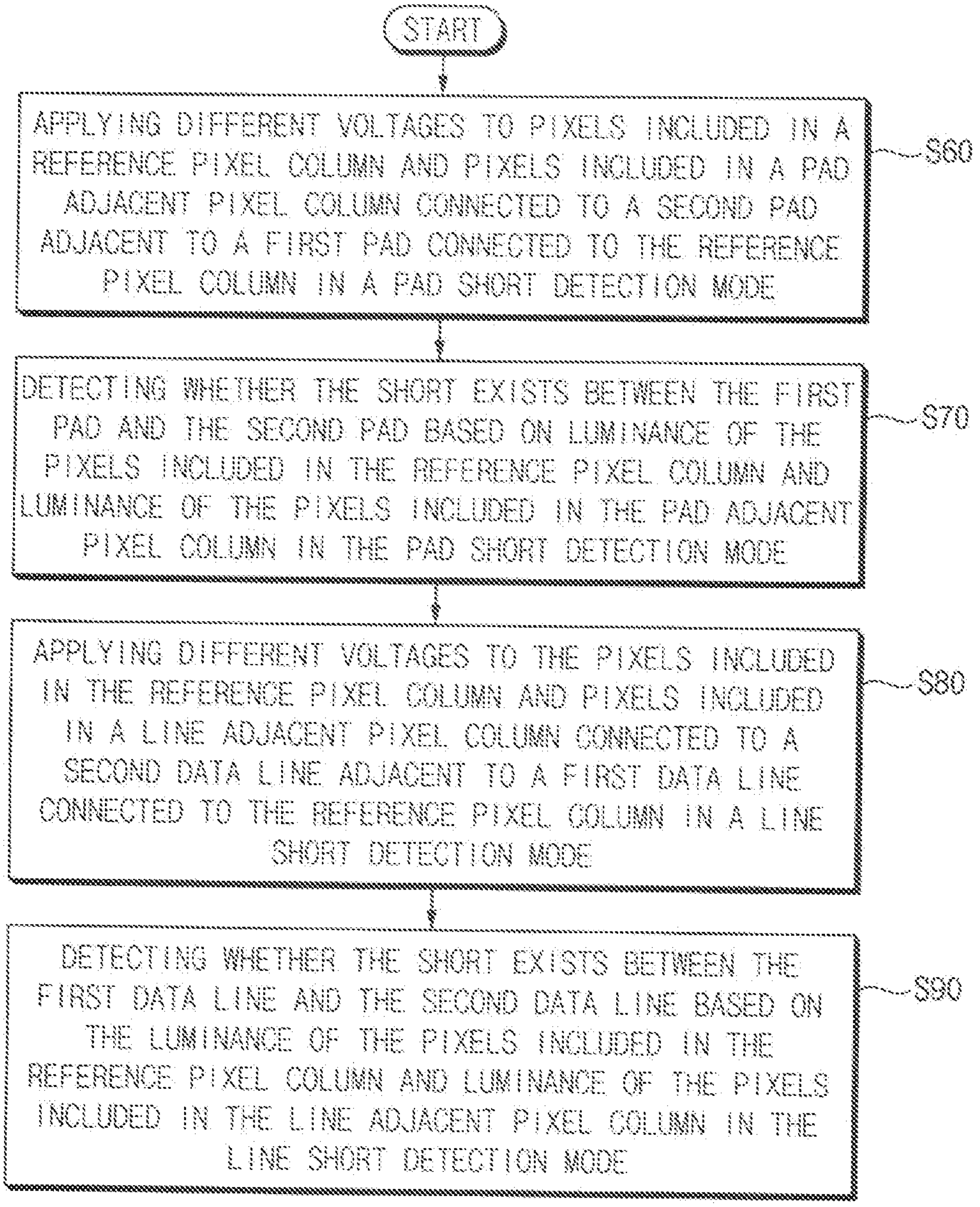
FIG. 12 is a flowchart schematically illustrating a method of detecting a short of a display device according to embodiments of the disclosure.
Figure 13:
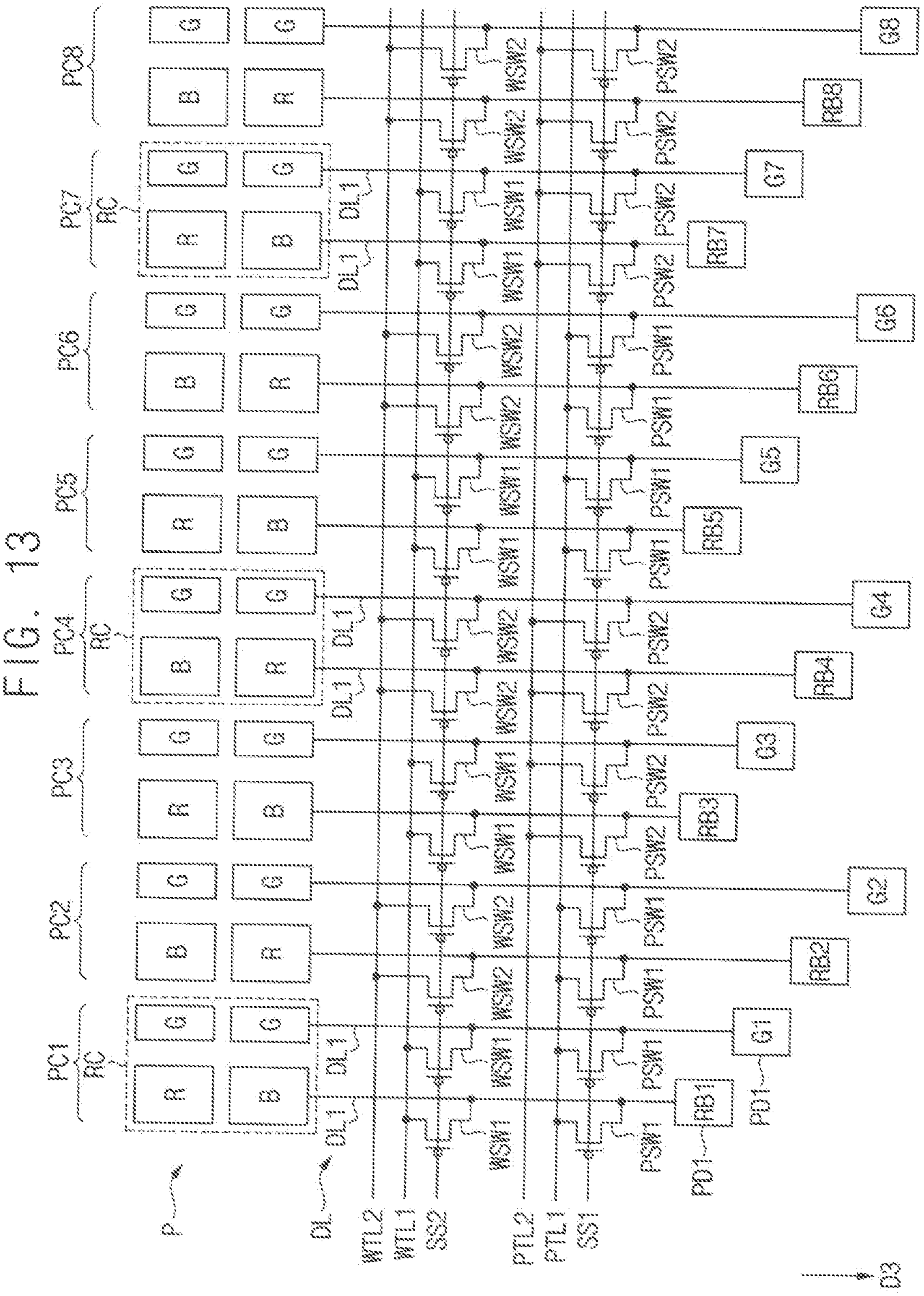
FIG. 13 is a diagram schematically illustrating an example of pixels, data lines, and pads of a display device in which the method of FIG. 12 may be performed.
Figure 14:
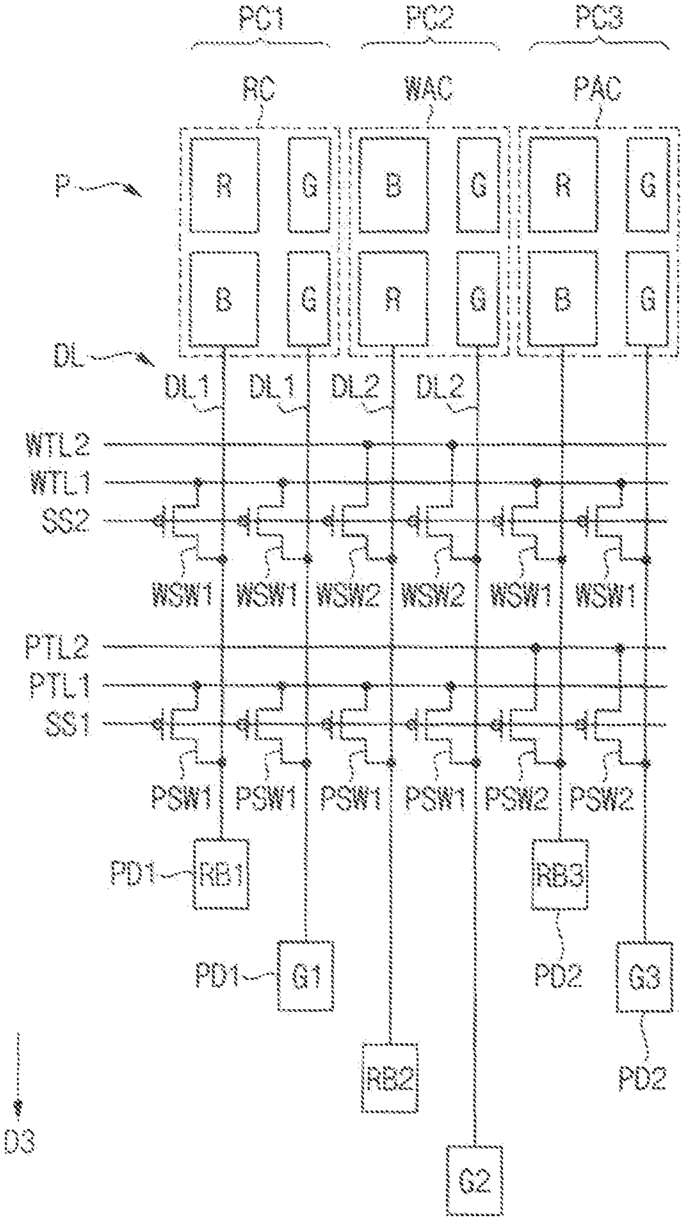
FIG. 14 is a diagram schematically illustrating FIG. 13 based on a first pixel column.

FIG. 12 is a flowchart schematically illustrating a method of detecting a short of a display device according to embodiments of the disclosure. FIG. 13 is a diagram schematically illustrating an example of the pixels P, the data lines DL, and the pads (RB1, G1, RB2, G2, . . . ) of a display device in which the method of FIG. 12 may be performed. FIG. 14 is a diagram schematically illustrating FIG. 13 based on the first pixel column PC1. FIG. 15 is a table schematically illustrating an example of detecting whether the short exists according to the method of FIG. 12.

Referring to FIGS. 12 to 15, the method of FIG. 12 may apply different voltages to pixels included in a reference pixel column RC and pixels included in a pad adjacent pixel column PAC connected to a second pad PD2 adjacent to a first pad PD1 connected to the reference pixel column RC in a pad short detection mode PSD (S60), detect whether the short exists between the first pad PD1 and the second pad PD2 based on luminance of the pixels included in the reference pixel column RC and luminance of the pixels included in the pad adjacent pixel column PAC in the pad short detection mode PSD (S70), apply different voltages to the pixels included in the reference pixel column RC and pixels included in a line adjacent pixel column WAC connected to a second data line DL2 adjacent to a first data line DL1 connected to the reference pixel column RC in a line short detection mode (S80), and detect whether the short exists between the first data line DL1 and the second data line DL2 based on the luminance of the pixels included in the reference pixel column RC and luminance of the pixels included in the line adjacent pixel column WAC in the line short detection mode (S90).

Referring to FIG. 13, in an embodiment, the pixel P may include a red pixel R, a blue pixel B, and a green pixel G. In an embodiment, a pixel column (PC1, PC2, . . . ) may include a red pixel R, a blue pixel B, and two green pixels G. In an embodiment, in a pixel column (PC1, PC2, . . . ), the same data line DL may be connected to the red pixel R and the blue pixel B, and the data line DL connected to the green pixel G may be different from the data line DL connected to the red pixel R and the blue pixel B.

In an embodiment, the data lines DL connected to pixels included in an odd pixel column (PC1, PC3, . . . ) may be connected to a first line test line WTL1, the data lines DL connected to pixels included in an even pixel column (PC2, PC4, . . . ) may be connected to a second line test line WTL2, the data lines DL connected to pixels included in a (L−3)-th pixel column (PC1, PC5, . . . ), where L may be a multiple of 4, and pixels included in a (L−2)-th pixel column (PC2, PC6, . . . ) may be connected to a first pad test line PTL1, and the data lines DL connected to pixels included in a (L−1)-th pixel column (PC3, PC7, . . . ) and pixels included in a L-th pixel column (PC4, PC8, . . . ) may be connected to a second pad test line PTL2. In an embodiment, a first line switching element WSW1 may be disposed between the first line test line WTL1 and the data lines DL connected to the pixels included in the odd pixel column (PC1, PC3, . . . ), a second line switching element WSW2 may be disposed between the second line test line WTL2 and the data lines DL connected to the pixels included in the even pixel column (PC2, PC4, . . . ), a first pad switching element PSW1 may be disposed between the first pad test line PTL1 and the data lines DL connected to the pixels included in the (L−3)-th pixel column (PC1, PC5, . . . ) and the (L−2)-th pixel column (PC2, PC6, . . . ), and a second pad switching element PSW2 may be disposed between the second pad test line PTL2 and the data lines DL connected to the pixels included in the (L−1)-th pixel column (PC3, PC7, . . . ) and the L-th pixel column (PC4, PC8, . . . ). For example, the first line switching element WSW1, the second line switching element WSW2, the first pad switching element PSW1, and the second pad switching element PSW2 may be PMOS transistors. The first pad switching element PSW1 and the second pad switching element PSW2 may be turned on SS1_ON or turned off SS1_OFF in response to a first switching signal SS1. The first line switching element WSW1 and the second line switching element WSW2 may be turned on SS2_ON or turned off SS2_OFF in response to a second switching signal SS2. In the line short detection mode WSD, the first line switching element WSW1 and the second line switching element WSW2 may be turned on SS2_ON, and the first pad switching element PSW1 and the second pad switching element PSW2 may be turned off SS1_OFF, and in the pad short detection mode PSD, the first pad switching element PSW1 and the second pad switching element PSW2 may be turned on SS1_ON, and the first line switching element WSW1 and the second line switching element WSW2 may be turned off SS2_OFF.

The data lines DL may include pads (RB1, G1, RB2, G2, . . . ) at an end. The pads (RB1, G1, RB2, G2, . . . ) may be connected to the pixels P through the data line DL. For example, the pads (RB1, G1, RB2, G2, . . . ) may be connected to an IC chip including the data driver. For example, the pads (RB1, G1, RB2, G2, . . . ) may connect the IC chip including the data driver and the data line DL. The pads (RB1, G1, RB2, G2, . . . ) may not be connected to anything except the data line DL while the short detection may be performed. All pads (RB1, G1, RB2, G2, . . . ) may have a stepwise arrangement by two pixel columns (PC1, PC2, . . . ). For example, as shown in FIG. 13, the pads RB2 and G2 connected to the second pixel column PC2 may be disposed at a position moved in the third direction D3 rather than the pads RB1 and G1 connected to the first pixel column PC1. For example, the pads RB3 and G3 connected to the third pixel column PC3 may not be disposed at a position moved in the third direction D3 rather than the pads RB1 and G1 connected to the first pixel column PC1. The third direction D3 may be independent of a layer, and all the pads (RB1, G1, RB2, G2, . . . ) may be disposed on the same layer. However, the third direction D3 may be only an example and embodiments are not limited thereto. Accordingly, the pads (RB1, G1, RB2, G2, . . . ) connected a N-th pixel column, where N may be a positive integer, may be adjacent to the pads connected to the (N+2)-th pixel column (RB1, G1, RB2, G2, . . . ). For example, the pads RB1 and G1 connected to the first pixel column PC1 may be adjacent to the pads RB3 and G3 connected to the third pixel column PC3. For example, the pads RB2 and G2 connected to the second pixel column PC2 may be adjacent to the pads RB4 and G4 connected to the fourth pixel column PC4. FIGS. 13 and 14 illustrate that the distance between the pads connected to the N-th pixel column and the pads connected to the (N+2)-th pixel column (e.g., the distance between RB1 and RB3) may be large for convenience. But, as shown in FIG. 6, the distance between the pads connected to the N-th pixel column and the pads connected to the (N+2)-th pixel column may be narrow enough to cause the short.

Referring to FIGS. 12 to 15, specifically, the method of FIG. 12 may apply different voltages to pixels included in a reference pixel column RC and pixels included in a pad adjacent pixel column PAC connected to a second pad PD2 adjacent to a first pad PD1 connected to the reference pixel column RC in a pad short detection mode PSD (S60). The method of FIG. 12 may apply the first test voltage TV1 to the first pad test line PTL1, and apply the second test voltage TV2 different from the first test voltage TV1 to the second pad test line PTL2.

For example, in case that the (K−2)-th pixel column (PC1, PC4, . . . ) may be determined as the reference pixel column RC, the first test voltage TV1 may be applied to the first pad test line PTL1, and the second test voltage TV2 may be applied to the second pad test line PTL2. For example, the pixels included in the (L−3)-th pixel column (PC1, PC5, . . . ) and the (L−2)-th pixel column (PC2, PC6, . . . ) may receive the first test voltage TV1, and the pixels included in the (L−1)-th pixel column (PC3, PC7, . . . ) and the L-th pixel column (PC4, PC8, . . . ) may receive the second test voltage TV2. Accordingly, difference voltages may be applied to the pixels included in the reference pixel column RC (i.e., the (K−2)-th pixel column in this example) and the pixels included in the pad adjacent pixel column PAC (e.g., the second pixel column PC2 and the sixth pixel column PC6 based on the fourth pixel column PC4 among the reference pixel column RC) connected to the second pad PD2 (e.g., RB2, G2, RB6, and G6 based on the fourth pixel column PC4 among the reference pixel column RC) adjacent to the first pad PD1 (i.e., RB1, G1, RB4, and G4, . . . in this example) connected to the reference pixel column RC (i.e., the (K−2)-th pixel column in this example).

For example, as shown in FIG. 13, when looking at the first pixel column PC1 as a reference, the first pads PD1 connected to the first pixel column PC1 may be RB1 and G1. The pads adjacent to pads RB1 and G1 connected to the first pixel column PC1 may be the pads RB3 and G3 connected to the third pixel column PC3. Accordingly, when looking at the first pixel column PC1 as a reference, the pad adjacent pixel column PAC may be the third pixel column PC3. Also, when looking at the fourth pixel column PC4 as a reference, the pad adjacent pixel column PAC may be the second pixel column PC2 and the sixth pixel column PC6. Accordingly, in the pad short detection mode PSD, the first test voltage TV1 may be applied to the pixels included in the first pixel column PC1 (i.e., the reference pixel column RC), the second test voltage TV2 may be applied to the pixels included in the third pixel column PC3 (i.e., the pad adjacent pixel column PAC based on the first pixel column PC1), the second test voltage TV2 may be applied to the pixels included in the fourth pixel column PC4 (i.e., the reference pixel column RC), the second test voltage TV2 may be applied to the pixels included in the second pixel column PC2 and the sixth pixel column PC6 (i.e., the pad adjacent pixel column PAC based on the fourth pixel column PC4). As a result, different voltages may be applied to the pixels included in the reference pixel column RC and the pixels included in the pad adjacent pixel column PAC.

Specifically, the method of FIG. 12 may detect whether the short exists between the first pad PD1 and the second pad PD2 based on luminance of the pixels included in the reference pixel column RC and luminance of the pixels included in the pad adjacent pixel column PAC in the pad short detection mode PSD (S70). For example, the detecting whether the short exists between the first pad PD1 and the second pad PD1 may include detecting whether the short exists between the first pad PD1 connected to the red pixel R and the blue pixel B included in the reference pixel column RC and the second pad PD2 connected to the red pixel R and the blue pixel B included in the pad adjacent pixel column PAC and detecting whether the short exists between the first pad PD1 connected to the green pixel G included in the reference pixel column RC and the second pad PD2 connected to the green pixel G included in the pad adjacent pixel column PAC.

For example, the first test voltage TV1 may be a high voltage HV (e.g., a voltage for the pixel P to display low luminance), and the second test voltage TV2 may be a low voltage LV (e.g., a voltage for the pixel P to display high luminance). In the first short detection period P1, the high voltage HV may be applied to the pixels included in the (L−3)-th pixel column (PC1, PC5, . . . ) and the (L−2)-th pixel column (PC2, PC6, . . . ), and the low voltage LV may be applied to the pixels included in the (L−1)-th pixel column (PC3, PC7, . . . ) and the L-th pixel columns (PC4, PC8, . . . ). Assuming that the reference pixel column RC may be the (K−2)-th pixel column, and taking the first pixel column PC1 and the third pixel column PC3 as an example, the high voltage HV may be applied to the pixels included in the first pixel column PC1, and the low voltage LV may be applied to pixels included in the third pixel column PC3. In case that the short does not exist between the pads RB1 and G1 connected to the first pixel column PC1 and the pads RB3 and G3 connected to the third pixel column PC3, the pixels included in the first pixel column PC1 may display low luminance, and the pixels included in the third pixel column PC3 may display high luminance. In case that the short exists between the pads RB1 and G1 connected to the first pixel column PC1 and the pads RB3 and G3 connected to the third pixel column PC3, the pixels included in the first pixel column PC1 and the third pixel column PC3 may display middle luminance due to a connection between the pads RB1 and G1 connected to the first pixel column PC1 and the pads RB3 and G3 connected to the third pixel column PC3. Accordingly, in the pad short detection mode PSD, the method of FIG. 12 may detect whether the short exists between the pads (RB1, G1, RB2, G2, . . . ) by detecting the pixels displaying the middle luminance.

Specifically, the method of FIG. 12 may apply different voltages to the pixels included in the reference pixel column RC and pixels included in a line adjacent pixel column WAC connected to a second data line DL2 adjacent to a first data line DL1 connected to the reference pixel column RC in a line short detection mode (S80). In the line short detection mode WSD, the first test voltage TV1 may be applied to the first line test line WTL1 and the second test voltage TV2 may be applied to the second line test line WTL2.

For example, in case that the (K−2)-th pixel column (PC1, PC4, . . . ) may be determined as the reference pixel column RC, the first test voltage TV1 may be applied to the first line test line WTL1, and the second test voltage TV2 may be applied to the second line test line WTL2. For example, the pixels included in the odd pixel column (PC1, PC3, . . . ) may receive the first test voltage TV1, and the pixels included in the even pixel column (PC2, PC4, . . . ) may receive the second test voltage TV2. Accordingly, difference voltages may be applied to the pixels included in the reference pixel column RC (i.e., the (K−2)-th pixel column in this example) and the pixels included in the line adjacent pixel column WAC (e.g., the third pixel column PC3 and the fifth pixel column PC5 based on the fourth pixel column PC4 among the reference pixel column RC) connected to the second data line DL2 (e.g., the data line DL connected to the third pixel column PC3 and the fifth pixel column PC5 based on the fourth pixel column PC4 among the reference pixel column RC) adjacent to the first data line DL1 connected to the reference pixel column RC (i.e., the (K−2)-th pixel column in this example).

For example, as shown in FIG. 13, when looking at the first pixel column PC1 as a reference, the line adjacent pixel column WAC connected to the second data line DL2 adjacent to the first data line DL1 connected to the first pixel column PC1 may be the second pixel column PC2. Also, when looking at the fourth pixel column PC4 as a reference, the line adjacent pixel column WAC may be the third pixel column PC3 and the fifth pixel column PC5. Accordingly, in the line short detection mode WSD, the first test voltage TV1 may be applied to the pixels included in the first pixel column PC1 (i.e., the reference pixel column RC), the second test voltage TV2 may be applied to the pixels included in the second pixel column PC3 (i.e., the line adjacent pixel column WAC based on the first pixel column PC1), the second test voltage TV2 may be applied to the pixels included in the fourth pixel column PC4 (i.e., the reference pixel column RC), and the second test voltage TV2 may be applied to the pixels included in the third pixel column PC3 and the fifth pixel column PC5 (i.e., the line adjacent pixel column WAC based on the fourth pixel column PC4). As a result, different voltages may be applied to the pixels included in the reference pixel column RC and the pixels included in the line adjacent pixel column WAC.

Specifically, the method of FIG. 12 may detect whether the short exists between the first data line DL1 and the second data line DL2 based on the luminance of the pixels included in the reference pixel column RC and luminance of the pixels included in the line adjacent pixel column WAC in the line short detection mode (S90). For example, the detecting whether the short exists between the first data line DL1 and the second pad PD1 may include detecting whether the short exists between the first data line DL1 connected to the red pixel R and the blue pixel B included in the reference pixel column RC and the second data line DL2 connected to the red pixel R and the blue pixel B included in the line adjacent pixel column WAC and detecting whether the short exists between the first data line DL1 connected to the green pixel G included in the reference pixel column RC and the second data line DL2 connected to the green pixel G included in the line adjacent pixel column WAC.

For example, the first test voltage TV1 may be the high voltage HV (e.g., a voltage for the pixel P to display low luminance), and the second test voltage TV2 may be the low voltage LV (e.g., a voltage for the pixel P to display high luminance). The high voltage HV may be applied to the pixels included in the odd pixel column (PC1, PC3, . . . ), and the low voltage LV may be applied to the pixels included in the even pixel column (PC2, PC4, . . . ). Assuming that the reference pixel column RC may be the (K−2)-th pixel column, and taking the first pixel column PC1 and the second pixel column PC2 as an example, the high voltage HV may be applied to the pixels included in the first pixel column PC1, and the low voltage LV may be applied to pixels included in the second pixel column PC2. In case that the short does not exists between the data line connected to the first pixel column PC1 and the data line DL connected to the second pixel column PC2, the pixels included in the first pixel column PC1 may display low luminance, and the pixels included in the second pixel column PC2 may display high luminance. In case that the short exists between the data line connected to the first pixel column PC1 and the data line DL connected to the second pixel column PC2, the pixels included in the first pixel column PC1 and the pixels included in the second pixel column PC2 may display middle luminance due to a connection between the data line DL connected to the first pixel column PC1 and the data line connected to the second pixel column PC2. Accordingly, in the line short detection mode WSD, the method of FIG. 12 may detect whether the short exists between the data lines DL by detecting the pixels displaying the middle luminance.

The disclosure may be applied to electronic devices including a display device. For example, the disclosure may be applied to a television (TV), a digital TV, a 3D TV, a mobile phone, a smart phone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

The foregoing is illustrative of the disclosure and is not to be construed as limiting thereof. Although a few embodiments of the disclosure have been described, those skilled in the art will readily appreciate that many modifications are possible in the embodiments without materially departing from the novel teachings and advantages of the disclosure. Accordingly, all such modifications are intended to be included within the scope of the disclosure.

What is claimed is:

1. A method of detecting a short of a display device comprising:

applying first different voltages to pixels included in a reference pixel column and pixels included in a pad adjacent pixel column electrically connected to a second pad adjacent to a first pad electrically connected to the reference pixel column;

applying second different voltages to the pixels included in the reference pixel column and pixels included in a line adjacent pixel column electrically connected to a second data line adjacent to a first data line electrically connected to the reference pixel column;

detecting whether the short exists between the first pad and the second pad based on luminance of the pixels included in the reference pixel column and luminance of the pixels included in the pad adjacent pixel column; and detecting whether the short exists between the first data line and the second data line based on the luminance of the pixels included in the reference pixel column and luminance of the pixels included in the line adjacent pixel column.

2. The method of claim 1, wherein the applying of the first different voltages to the pixels included in the reference pixel column and the pixels included in the pad adjacent pixel column includes:

applying a first test voltage to the pixels included in the reference pixel column; and applying a second test voltage different from the first test voltage to the pixels included in the pad adjacent pixel column.

3. The method of claim 2, wherein the applying the second different voltages to the pixels included in the reference pixel column and the pixels included in the line adjacent pixel column includes:

applying the second test voltage to the pixels included in the line adjacent pixel column.

4. The method of claim 3, wherein pads electrically connected to a N-th pixel column, where N is a positive integer, are adjacent to pads electrically connected to a (N+2)-th pixel column.

5. The method of claim 4, wherein all pads have a stepwise arrangement of two pixel columns.

6. The method of claim 4, wherein data lines electrically connected to pixels included in a (K−2)-th pixel column, where K is a multiple of 3, are electrically connected to a first test line, data lines electrically connected to pixels included in a (K−1)-th pixel column are electrically connected to a second test line, and data lines electrically connected to pixels included in a K-th pixel column are electrically connected to a third test line.

7. The method of claim 6, wherein a first switching element is disposed between the first test line and the data lines electrically connected to the pixels included in the (K−2)-th pixel column, a second switching element is disposed between the second test line and the data lines electrically connected to the pixels included in the (K−1)-th pixel column, and a third switching element is disposed between the third test line and the data lines electrically connected to the pixels included in the K-th pixel column.

8. The method of claim 6, further comprising:

determining the reference pixel column as the (K−2)-th pixel column in a first short detection period;

determining the reference pixel column as the (K−1)-th pixel column in a second short detection period; and determining the reference pixel column as the K-th pixel column in a third short detection period.

9. The method of claim 1, wherein each of the reference pixel column, the pad adjacent pixel column, and the line adjacent pixel column includes a red pixel, a blue pixel, and two green pixels.

10. The method of claim 9, wherein the detecting of whether the short exists between the first pad and the second pad includes:

detecting whether the short exists between the first pad electrically connected to the red pixel and the blue pixel included in the reference pixel column and the second pad electrically connected to the red pixel and the blue pixel included in the pad adjacent pixel column; and detecting whether the short exists between the first pad electrically connected to the green pixel included in the reference pixel column and the second pad electrically connected to the green pixel included in the pad adjacent pixel column.

11. The method of claim 9, wherein the detecting of whether the short exists between the first data line and the second data line includes:

detecting whether the short exists between the first data line electrically connected to the red pixel and the blue pixel included in the reference pixel column and the second data line electrically connected to the red pixel and the blue pixel included in the line adjacent pixel column; and detecting whether the short exists between the first data line electrically connected to the green pixel included in the reference pixel column and the second data line electrically connected to the green pixel included in the line adjacent pixel column.

12. A method of detecting a short of a display device comprising:

applying first different voltages to pixels included in a reference pixel column and pixels included in a pad adjacent pixel column electrically connected to a second pad adjacent to a first pad electrically connected to the reference pixel column in a pad short detection mode;

detecting whether the short exists between the first pad and the second pad based on luminance of the pixels included in the reference pixel column and luminance of the pixels included in the pad adjacent pixel column in the pad short detection mode;

applying second different voltages to the pixels included in the reference pixel column and pixels included in a line adjacent pixel column electrically connected to a second data line adjacent to a first data line electrically connected to the reference pixel column in a line short detection mode; and detecting whether the short exists between the first data line and the second data line based on the luminance of the pixels included in the reference pixel column and luminance of the pixels included in the line adjacent pixel column in the line short detection mode.

13. The method of claim 12, wherein pads electrically connected to a N-th pixel column, where N is a positive integer, are adjacent to pads electrically connected to a (N+2)-th pixel column.

14. The method of claim 13, wherein data lines electrically connected to pixels included in an odd pixel column are electrically connected to a first line test line, data lines electrically connected to pixels included in an even pixel column are electrically connected to a second line test line, data lines electrically connected to pixels included in a (L−3)-th pixel column, where L is a multiple of 4, and pixels included in a (L−2)-th pixel column are electrically connected to a first pad test line, and data lines electrically connected to pixels included in a (L−1)-th pixel column and pixels included in a L-th pixel column are electrically connected to a second pad test line.

15. The method of claim 14, wherein a first test voltage is applied to the first pad test line, and a second test voltage different from the first test voltage is applied to the second pad test line in the pad short detection mode.

16. The method of claim 14, wherein a first test voltage is applied to the first line test line, and a second test voltage different from the first test voltage is applied to the second line test line in the line short detection mode.

17. The method of claim 14, wherein a first line switching element is disposed between the first line test line and the data lines electrically connected to the pixels included in the odd pixel column, a second line switching element is disposed between the second line test line and the data lines electrically connected to the pixels included in the even pixel column, a first pad switching element is disposed between the first pad test line and the data lines electrically connected to the pixels included in the (L−3)-th pixel column and the (L−2)-th pixel column, and a second pad switching element is disposed between the second pad test line and the data lines electrically connected to the pixels included in the (L−1)-th pixel column and the L-th pixel column.

18. The method of claim 17, wherein the first line switching element and the second line switching element are turned on, and the first pad switching element and the second pad switching element are turned off in the line short detection mode, and the first pad switching element and the second pad switching element are turned on, and the first line switching element and the second line switching element are turned off.

19. The method of claim 12, wherein each of the reference pixel column, the pad adjacent pixel column, and the line adjacent pixel column includes a red pixel, a blue pixel, and two green pixels.

20. The method of claim 19, wherein the detecting whether the short exists between the first pad and the second pad includes:

detecting whether the short exists between the first pad electrically connected to the red pixel and the blue pixel included in the reference pixel column and the second pad electrically connected to the red pixel and the blue pixel included in the pad adjacent pixel column, and detecting whether the short exists between the first pad electrically connected to the green pixel included in the reference pixel column and the second pad electrically connected to the green pixel included in the pad adjacent pixel column, and the detecting whether the short exists between the first data line and the second data line includes:

detecting whether the short exists between the first data line electrically connected to the red pixel and the blue pixel included in the reference pixel column and the second data line electrically connected to the red pixel and the blue pixel included in the line adjacent pixel column, and detecting whether the short exists between the first data line electrically connected to the green pixel included in the reference pixel column and the second data line electrically connected to the green pixel included in the line adjacent pixel column.

* * * * *